Patented July 11, 1950

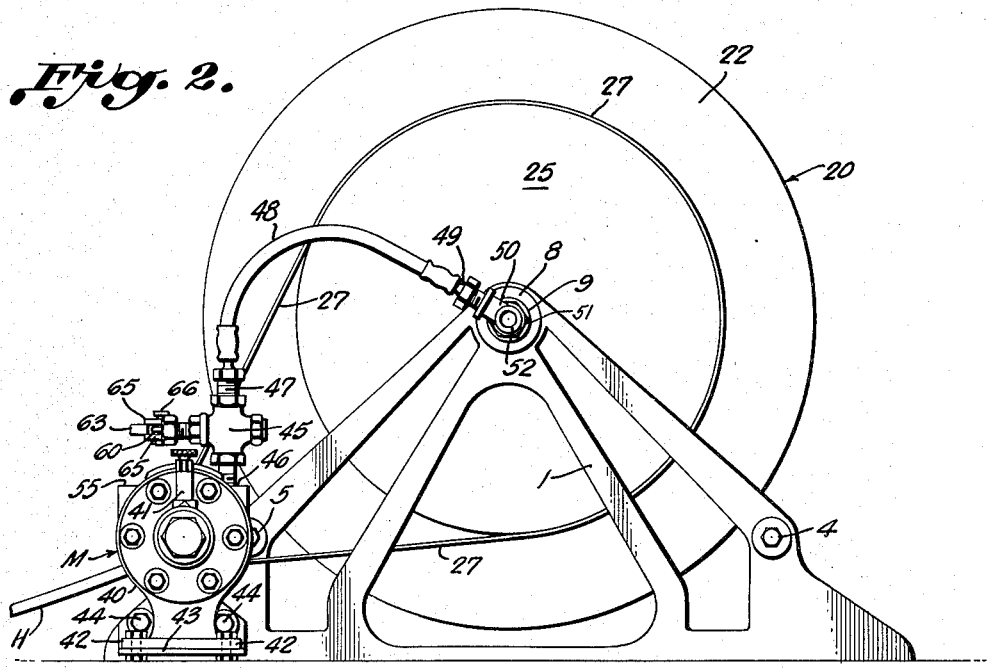
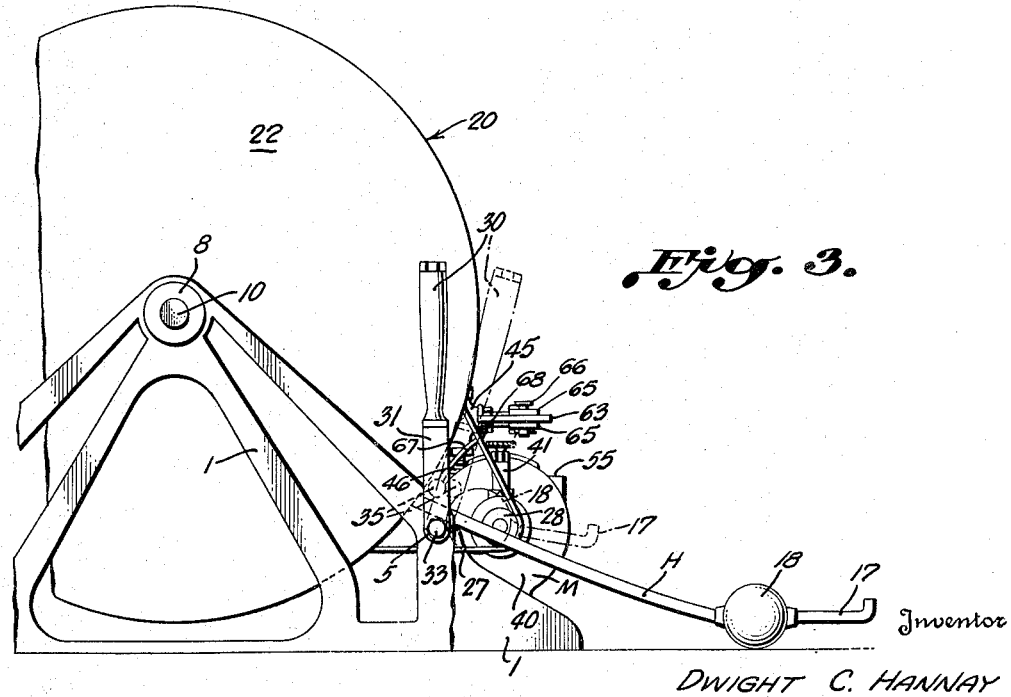

2,514,862

UNITED STATES PATENT OFFICE 2,514,862

HOSE REEL

Dwight C. Hannay, Westerlo, N. Y., assignor to Clifford B. Hannay & Son, Inc., Westerlo, N. Y., a corporation of New York Application February 24, 1948, Serial No. 10,409

6 Claims. (Cl. 299—78)

This invention relates to those reels of the kind which provide a connection from a source of fluid to a hose that remains attached to the reel and may be wound or unwound from the reel, as desired, without disconnection from the source of fluid. The invention deals, more particularly, with hose reels of this character which operate automatically to rewind the hose after it has been unreeled for a dispensing operation.

A primary object of the invention is to provide a hose reel of the kind described which comprises an improved construction of a power driven mechanism for rewinding the hose on the reel together with automatic means for discontinuing the operation of such rewinding mechanism when the hose has been fully rewound on the reel.

Another object of the invention is to provide a hose reel apparatus in which the hose may be unwound from the reel to any desired length under a minimum ordinary pull by the operator, and in which the hose remains extended in any such position for a dispensing operation or other purpose without requiring the operator to pull constantly on the hose to hold the same against rewinding on the reel in the highly objectionable manner that is required in using hose reels having spring rewinding means, and the like.

A further object of the invention is to provide a hose reel apparatus of this kind in which the hose may be unreeled freely and without tension and strain on the hose.

Another object of the invention is to provide in a hose reel apparatus of the character described an improved power driven mechanism for rewinding the hose reel which is actuated by the source of air or fluid to which the hose reel is connected, together with means automatically shutting off the source of air or fluid to the power driven rewinding mechanism when the hose is fully rewound on the reel.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 2 is a side elevational view of the hose reel apparatus as seen from the right of Fig. 1; and, Fig. 3 is a fragmentary side elevational view of the improved hose reel apparatus as viewed from the left of Fig. 1.

Figure 1:
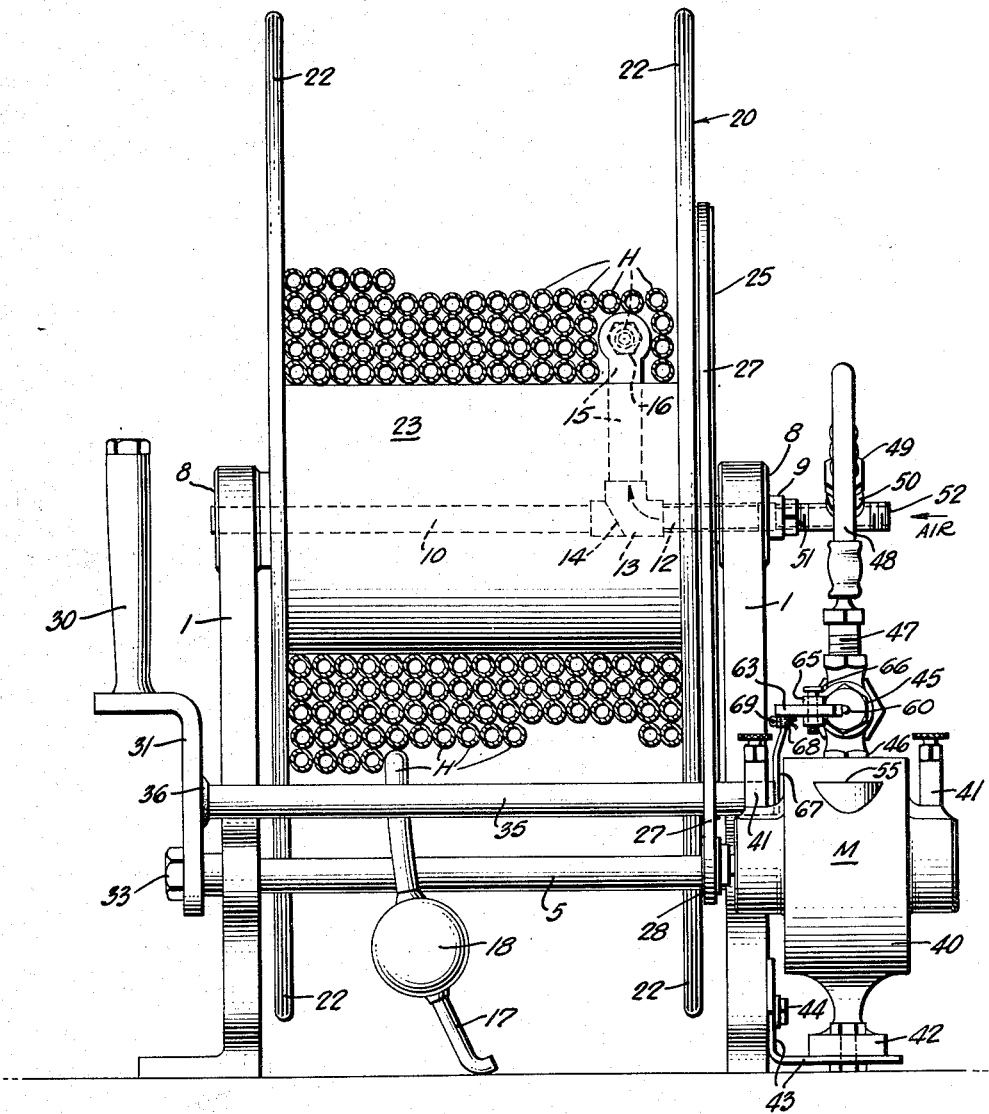
Fig. 1 is a front elevational view of an improved hose reel apparatus in accordance with the invention.

Referring now, more particularly, to the drawings, the improved hose reel apparatus of the invention is disclosed, by way of illustration only, in a preferred construction for an air hose such as used in automobile service stations, and the like. It is to be understood, however, that the invention is not limited to the specific type and design of hose reel shown, but rather, is equally adaptable to a wide range and variety of other designs for any similar or related type of hose reel construction. It is to be understood, further, that while the invention is disclosed, more particularly, in connection with a hose reel for delivering air, the invention fully contemplates the provision of equivalent hose reel apparatus embodying the general principles and teachings of the invention in constructions designed for dispensing other types of gases and fluids such as oil and water. The term "fluid," therefore, as used in this description is intended to refer to all types of liquids and gases, such as oil, water and air.

In the present example, the hose reel is shown provided with a mounting on a base defined by spaced vertical brackets 1 secured in spaced relation by suitable supporting means including a cross rod 4, Fig. 2, at the rearward end of the base, and a similar cross rod 5 at the forward end thereof. The cross rods 4, 5, are secured to said brackets 1 in any suitable way as, for example, by stud bolts threaded into tapped holes in the ends of said cross rods. The brackets 1 may be provided in any other suitable design or construction for mounting the hose reel in a particular installation and in any form include bearings 8 provided by suitable bushings, or the like, receiving the journals defined by the ends of a central shaft 10, rotatably mounting the hose reel 20.

The central shaft 10 includes a tubular shaft portion 12, Fig. 1, having its outer end rotatably supported in a fluid tight packing joint in the associated bearing 8 in communication with a suitable coupling 9 provided on the outer side of said bearing. The inner end of the tubular shaft portion 12 is joined to a suitable elbow such as a T-coupling 13 formed with an inner imperforate baffle 14 and providing a connection to an outlet pipe 15 extending radially of the hose reel drum with the outer end of said outlet pipe 15 connected by a suitable fitting 16 to an air hose H. The other end of said T-coupling 13 is joined to the supporting shaft 10 in the completed central shaft structure thus provided. Accordingly, air or other fluid admitted into the outer end of said tubular shaft 12 through the coupling 9 passes through said tubular shaft portion 12 where it is deflected by the baffle 14 in the elbow 13, in the direction indicated by the curved arrow in Fig. 1, outwardly through the outlet pipe 15 into the hose H connected thereto.

The frame of the hose reel, designated generally 20, comprises a pair of spaced side discs or flanges 22 on either side of a central drum 23 preferably in the form of a sheet metal cylinder suitably secured between said flanges or discs 22. The drum 23 is provided with a cut-out opening through which there extends the outlet pipe 15 that is connected to the air or fluid passage defined by the tubular shaft portion 12, as aforesaid. The hose H is connected to the outer end of said outlet pipe 15 outwardly of the drum 23 and from this point is coiled around said drum between the side flanges 22 in the usual manner with the leading end of the hose arranged to pass over the forward cross-bar 5 substantially as shown in Fig. 1. The leading end of said hose H is provided with a suitable dispensing nozzle 17 of the type commonly used in air hose apparatus, and the like, which comprise an automatic or manually operated shut-off valve. Adjacent said nozzle, an enlargement 18 made of rubber or other resilient material is provided in any suitable manner as, for example, in the form of a ball-shaped stop, or the like.

As shown in Figs. 1 and 2, a relatively large pulley or wheel 25 is mounted concentrically on the outer side of one of the hose reel side flanges or discs 22 by any suitable securing means. A belt 27 on the rim of said pulley 25 is connected to a drive pulley 28 on the shaft of an air or fluid motor M. The motor M is powered by the same source of air or other fluid which is dispensed by the hose reel apparatus, and is normally inoperative but adapted to be energized under certain conditions, presently to be described, to rotate said drive pulley 28 which in turn revolves the large driven wheel or pulley 25 through the belt 27 to rotate the hose reel for any rewinding operation of the hose thereon.

Referring to Figs. 1 and 3, it will be understood that the forward cross rod 5 is rotatably mounted in secured relation to the spaced vertical brackets 1 in such a way that it may be oscillated by a handle 30 fixedly secured to an outer projecting end of said cross rod 5 as by a flange member 31, Fig. 1. The flange 31 is connected to the cross rod 5 by any suitable means such as a stud bolt 33 threaded into a tapped hole in the projecting end of said cross rod 5.

A horizontally extending cross bar 35 is secured to the intermediate portion of the handle flange 31 in any suitable way as by welding 36, Fig. 1. The bar 35 extends in generally parallel and spaced relation to the cross rod 5 and is spaced therefrom a distance less than the size of the enlargement or stop 18 on the leading end of the hose H. Thus, while the hose H may pass readily through the space between the cross rod 5 and the bar 35, the stop or enlargement 18 on the leading end of the hose outwardly thereof, as seen in Fig. 3, cannot pass between said cross rod and bar at any point. The cross rod 5 and cross bar 35 in such generally parallel and spaced relation define a rectangular guide opening through which the hose H passes on being wound or unwound from the reel and, by reason of the rounded formation thereof, serve in the manner of anti- friction rollers minimizing resistance and drag on the hose in any such operation. In addition, the cross bar 35 is so positioned that at the end of any rewinding operation of the hose on the reel, the stop or enlargement 18 on the end of the hose strikes said bar 35 to discontinue the operation of the hose rewinding mechanism and otherwise terminate the rewinding motion of the hose reel, as presently to be described. The cross bar 35, accordingly, defines a strike bar for the stop 18 on the hose, and by virtue of the mounting thereof on the rotatable cross rod 5, is adapted to oscillate as from the full line to the broken line position of the handle 30, as shown in Fig. 3. This mounting of the strike bar 35 to oscillate is employed as a control for the air or fluid motor M to start said motor for any rewinding operation of the hose reel when the handle 30 is moved forwardly to the broken line position shown in Fig. 3, and to discontinue the operation of said motor M at the end of any such rewinding operation when the stop 18 on the leading end of the hose hits the strike bar 35 to move the same back to its initial inoperative position indicated by the full line showing of the handle 30 in Fig. 3.

The air motor M may be of any available standard construction and in the present example, is shown as preferably a small compact unit contained in a housing 40 provided with the usual grease fittings 41 and base flanges 42 bolted to a supporting plate 43 which is secured to the adjacent vertical bracket 1 of the hose reel base in any suitable manner as by bolts 44. A valve 45 preferably of the type having the form of a T-coupling is connected at one end 46 to the inlet port of the motor M while a suitable fitting 47 connects the other end to a by-pass line or conduit 48 which in turn is connected by a fitting 49 threaded into the central opening in a T-connection 50. The inner end of the T-connection 50 is joined to the coupling 9 in communication with the tubular shaft portion 12 in any suitable manner as by threading said inner end into the coupling 9 together with a lock nut 51 locking the connection. The outer end 52 of the T-connection 50, accordingly, extends free for connecting thereto the source of air or other fluid. Preferably the conduit or hose 48 is provided in a length slightly greater than necessary to extend in a loop as shown in Fig. 2 so that it may be distended as required for any change in the position of the motor. The motor otherwise includes an outlet port 55 on the side opposite the inlet 46 serving as an exhaust or outlet for the air or fluid passing through the motor when the same is operated.

The valve 45 may be of any suitable type and in the present example is shown provided as one operated by an axially movable stem 60 which normally projects outwardly when the valve is closed and is adapted to be pushed inwardly to open said valve 45. A crank lever 63 is pivotally mounted at one side of the valve 45 so that the outer end of said lever 63 is adapted to push said valve stem 60 inwardly when it is desired to open said valve. The pivotal mounting of the crank lever 63 is provided by a pair of spaced apertured ears 65 receiving the crank lever 63 in the space therebetween and a pintle 66 extending through aligned openings in said apertured ears and a central opening in said crank lever 63.

The inner end of the crank lever 63, Fig. 1, is connected to the adjacent inner end of the horizontal strike bar 35 by a connecting arm 67 which provides for pivotal movement of said crank lever 63 responsive to movement of said strike bar 35. The connecting arm 67 is joined to the end of the strike bar 35 as by welding or equivalent means and is connected to the end of the crank lever 63 in any suitable manner as, for example, by a stud portion on the end thereof received in a socket 68 on the crank lever 63 and secured therein by a cotter pin 69 extending through aligned cotter pin holes provided in said socket and stud portion.

From the foregoing, it will be understood that in a hose reel apparatus in accordance with the invention, the tubular shaft portion 12, Fig. 1, is rotatably mounted inside the bearing 8 and coupling 9 and connected to the source of air or fluid through the T-connection 50. The tubular shaft portion 12 is thus arranged for rotation yet is rigidly supported in the associated bearing 8 of the hose reel base. In connection with the T-coupling 14 within the drum 23, said tubular shaft portion 12 serves as a rotatable support for the adjacent side of the hose reel in cooperation with the shaft portion 10 which is connected to the other end of the T-coupling 13 and rotatably mounted in the opposite bearing 8 to support the hose reel on the side opposite said tubular shaft portion 12.

The tubular shaft portion 12 in addition to this function, serves as a passage for the air or other fluid which enters the inlet connection 52 from the source of supply. The air thus passes through the tubular shaft 12 to the T-coupling 13 where the integral imperforate baffle 14 therein directs the air through the outlet pipe 15 to the hose H connected to said outlet pipe. The hose as thus connected to the outlet pipe 15 is coiled around the drum 23 between the side flanges or discs 22 in the customary manner. Accordingly, for any dispensing operation, the hose is adapted to be easily pulled and thereby readily unwound from the drum 23 for any desired length during which the inner end of the hose R remains connected to the outlet pipe 15 and rotates along therewith and the hose reel drum 23 as permitted by the aforesaid rotatable mounting of the tubular shaft portion 12. When the desired length of hose has been drawn from the drum 23 the hose remains in such extended position without requiring the operator to pull constantly on the hose to hold the same against rewinding on the reel as is required in the use of hose reels having spring rewinding means, and the like. When it is desired to dispense air or other fluid from the hose, the shut-off in the nozzle 17 on the leading end of the hose is opened to commence the dispensing operation without further preparation inasmuch as the hose is already connected to the source of air or fluid entering through the outer end 52 of the T-connection 50 into the tubular shaft 12, the T-coupling 13, and then through the outlet pipe 15 to the hose H, as aforesaid.

At the end of a dispensing operation, the flow of air through the hose H is stopped by the shut-off nozzle 17, whereupon the improved rewinding mechanism of the invention is employed to rewind the hose on the drum 23 automatically and otherwise discontinue the rotation of the reel when the hose is fully rewound thereon. To this end, the T-connection 50, Fig. 1, provides a by-pass of the air or fluid through the pipe 48 and valve 45 to the motor M so that when said valve 45 is opened, the source of air is directed through said by-pass pipe 48 to operate the motor and thereby rotate the reel through the drive pulley 28, belt 27 and driven pulley 25 attached to said reel. When the hose has thus been fully rewound on the reel the arrangement is such that the valve 45 is automatically closed, thus stopping the operation of the motor so that there is no further rotation of the hose reel.

During any dispensing operation of air through the nozzle 17, the valve 45 is normally closed and in this position, the handle 30, Figs. 1 and 3, which operates said valve 45 through the strike bar 35, arm 67 and lever 63, is in retracted normal position shown in full lines in Fig. 3, and the strike bar 35 carried by said handle, also is in retracted position. Whenever it is desired to rewind any length of hose H which has been drawn from the reel for a dispensing operation, the handle H, accordingly, is moved forwardly to the angular position shown in broken lines in Fig. 3. This positions the strike bar 35 a suitable distance in advance of its normal retracted position as necessary to cause said strike bar 35 to move the connecting arm 67 to open the valve 45. The arrangement is such that the movement of the connecting arm 67 against the adjacent end of the pivoted crank lever 63 causes the opposite end of said lever 63 to force the valve stem 60 inwardly and thereby open the valve 45. The motor M then receives air or fluid from the source of supply through the by-pass conduit 48 and T-connection 50. The motor thus operates to rotate the pulley 28 to drive the belt 27 and the belt 27 revolves the large pulley 25 which rotates the hose reel 20 to rewind the hose H on the reel, substantially as shown in Fig. 1.

When the hose H is fully rewound on the reel, the enlargement 18 approaches the strike bar 35. The enlargement 18, however, is of such size that it cannot pass through the space between the strike bar 35 and cross rod 5, as aforesaid, and accordingly, the enlargement 18 hits the strike bar 35 under the force exerted on the hose by the hose reel being rotated by the power of the motor M. When the enlargement 18 hits the strike bar 35, the strike bar is sharply knocked rearwardly to its initial, normal retracted location in the retracted position of the handle 30, as shown in full lines in Fig. 3. Such movement of the strike bar 35 causes an instantaneous closing of the valve 45 to cut-off the air to the air motor M which discontinues the operation of said air motor M so that there is no further rotation of the reel 20. This action involves a reversal of the action described for opening the valve 45 and comprises a movement of the connecting arm 67 rearwardly by the strike bar 35 to cause the crank lever 63 to pivot in a manner which permits the valve stem 60 to project outwardly to close said valve 45 and thereby prevent further passage of fluid to the motor M.

Thus, with the hose fully rewound on the reel, the various elements of the hose reel rewinding mechanism are returned automatically to their initial normal position in readiness for the hose to be drawn from the reel for another dispensing operation as required, after which the hose is automatically rewound on the reel in a repetition of the foregoing described procedure.

In the present example, the invention has been described with particular reference to an air hose reel and the associated air motor for rewinding the reel by means of the by-passed air from the same source of supply which enters the inlet port 46 of the motor and exhausts through the outlet port 55. Along the same lines, the invention is equally applicable to similar hose reel apparatus for dispensing fluids such as oil and water in which event the motor M would be provided as a suitable fluid operated motor whereby the by-passed fluid for operating the motor would likewise enter the inlet port 46 and exhaust through the outlet port 55 but would flow into a suitable pipe connected to said outlet port 55 to return this fluid to the source of supply or to some point in the supply line or other location where it may be disposed of as desired.

While the invention has been described in detail with a specific example, such example is intended as an illustration only, inasmuch as it will be apparent that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed and desired to be secured by United States Letters Patent is:

1. In a hose reel apparatus comprising a base and a rotatable hose reel mounted on said base, a hose wound on said reel having a stop adjacent its free end, means for rotating said reel to rewind the hose drawn from said reel, a strike member extending transversely across said hose reel and pivotally mounted in the path of said stop on the hose, said strike member controlling the operation of said reel rotating means and being movable from an initial inoperative position to a position rendering said reel rotating means operative to rewind the hose on the reel automatically, said stop on the hose being adapted to engage said strike member at any point along the length of said strike member across the hose reel when the hose is rewound on the reel to return said strike member to its initial inoperative position and thereby automatically stop the operation of said reel rotating means to end the hose rewinding operation.

2. In a hose reel apparatus comprising a base and a rotatable hose reel mounted on said base, a hose wound on said reel having a stop adjacent its free end, means for rotating said reel to rewind the hose drawn from said reel, a pair of spaced parallel bars mounted on said base on opposite sides of said hose and extending transversely across said hose reel in the path of said stop on the hose, one of said bars being a pivotally mounted strike bar controlling the operation of said reel rotating means and being movable from an initial inoperative position to a position rendering said reel rotating means operative to rewind the hose on the reel automatically, said stop on the hose being adapted to engage said strike bar at any point along the length of said bar across the hose reel when the hose is rewound on the reel to return said strike bar to its initial inoperative position and thereby automatically stop the operation of said reel rotating means to end the hose rewinding operation.

3. In a hose reel apparatus comprising a base and a rotatable hose reel mounted on said base, a hose wound on said reel having a stop adjacent its free end, means for rewinding the hose drawn from said reel comprising a motor, a strike member extending transversely across said hose reel and pivotally mounted in the path of said stop on the hose, said strike member controlling the operation of said motor and being movable from an initial inoperative position to a position rendering said motor operative to rotate the hose reel and rewind the hose thereon automatically, said stop on the hose being adapted to engage said strike member at any point along the length of said strike member across the hose reel when the hose is rewound on the reel to return said strike member to its initial inoperative position and thereby automatically stop the operation of said motor to end the hose rewinding operation.

4. In a hose reel apparatus comprising a base and a rotatable hose reel mounted on said base, a hose wound on said reel having a stop adjacent its free end, means for rewinding the hose drawn from said reel comprising a fluid motor connected to the source of fluid supplied to said hose, a valve on said motor, a pair of spaced parallel bars mounted on said base transversely across said hose reel on opposite sides of said hose and extending into the path of said stop on the hose, one of said bars being a pivotally mounted strike bar, means connected to said strike bar for operating said valve to actuate said fluid motor, said strike bar controlling the operation of said fluid motor and being movable from an initial inoperative position to a position opening said valve to render said fluid motor operative to rotate the reel and rewind the hose thereon automatically, said stop on the hose being adapted to engage said strike bar at any point along the length of said bar across the hose reel when the hose is rewound on the reel to return said strike bar to its initial inoperative position to close said valve and thereby automatically stop the operation of said fluid motor to end the hose rewinding operation.

5. In a hose reel apparatus comprising a base and a hose reel carried by said base, means rotatably mounting the hose reel on said base, comprising a tubular shaft portion having an inner end extending into and supporting the hose reel and an outer end supported on said base, a tubular coupling having a lateral opening and a baffle therein adjacent said opening defining an elbow at one end of said coupling connected to the inner end of said tubular shaft, a shaft connected to the other end of said coupling and supporting the hose reel on said base on the side opposite said tubular shaft, an outlet pipe connected to said lateral opening in the coupling and extending radially of the hose reel, a hose wound on said reel and connected to said outlet pipe and having a stop adjacent its free end, means for rewinding the hose drawn from said reel comprising a fluid motor connected to the source of fluid supplied to said hose, a valve on said motor, a pair of spaced parallel bars mounted transversely across said hose reel on oppositie sides of said hose and extending into the path of said stop on the hose, one of said bars being a movably mounted strike bar, means connected to said strike bar for operating said valve to actuate said motor, said strike bar controlling the operation of said fluid motor and being movable from an initial inoperative position to a position opening said valve to render said fluid motor operative to rotate the reel and rewind the hose thereon automatically, said stop on the hose being adapted to engage said strike bar at any point along the length of said bar across the hose reel when the hose is rewound on the reel to return said strike bar to its initial inoperative position to close said valve and thereby automatically stop the operation of said fluid motor to end the hose rewinding operation.

6. In a hose reel apparatus comprising a base and a hose reel carried by said base, means rotatably mounting the hose reel on said base, comprising, a tubular shaft portion having an inner end extending into and supporting the hose reel and an outer end supported on said base, a tubular coupling having a lateral opening and a baffle therein adjacent said opening defining an elbow at one end of said coupling connected to the inner end of said tubular shaft, a shaft connected to the other end of said coupling and supporting the hose reel on said base on the side opposite said tubular shaft, an outlet pipe connected to said lateral opening in the coupling and extending radially of the hose reel, a hose wound on said reel connected to said outlet pipe and having a stop adjacent its free end, means or rewinding the hose drawn from said reel comprising a fluid motor connected to the source of fluid supplied to said hose, a valve on said motor and a lever for operating said valve, a pair of spaced parallel bars mounted on said base transversely across said hose reel on opposite sides of said hose thereby defining a guide opening for the hose and extending into the path of said stop on the hose, one of said bars being a movably mounted strike bar, an arm connected to said strike bar and engaging said lever to operate said valve and actuate said fluid motor, said strike bar controlling the operation of said fluid motor and being movable from an initial inoperative position to a position opening said valve to render said fluid motor operative to rotate the reel and rewind the hose thereon automatically, said stop on the hose being adapted to engage said strike bar at any point along the length of said bar across the hose reel when the hose is rewound on the reel to return said strike bar to its initial inoperative position to close said valve and thereby automatically stop the operation of said fluid motor to end the hose rewinding operation.

DWIGHT C. HANNAY.

REFERENCES CITED

The following references are of record in the file of this patent:

UNITED STATES PATENTS

| Number | Name | Date |
|---|---|---|
| 1,282,438 | Lamb | Oct. 22, 1918 |
| 1,489,664 | Dowrelio | Apr. 8, 1924 |
| 1,499,644 | Dowrelio | July 1, 1924 |
| 2,301,208 | Gear | Nov. 10, 1942 |
| 2,315,085 | Churchward | Mar. 30, 1943 |